US008483262B2

(12) United States Patent
Mainini et al.

(10) Patent No.: US 8,483,262 B2
(45) Date of Patent: Jul. 9, 2013

(54) PIEZOELECTRIC CABLE PERIMETER MONITORING SYSTEM

(75) Inventors: Christopher E. Mainini, Knoxville, TN (US); Randal D. Boyd, Knoxville, TN (US)

(73) Assignee: Radio System Corporation, Knoxville, TN (US)

( * ) Notice: Subject to any disclaimer, the term of this patent is extended or adjusted under 35 U.S.C. 154(b) by 1819 days.

(21) Appl. No.: 11/746,385

(22) Filed: May 9, 2007

(65) Prior Publication Data

US 2007/0205893 A1 Sep. 6, 2007

Related U.S. Application Data

(63) Continuation-in-part of application No. 11/214,522, filed on Aug. 30, 2005, now abandoned, which is a continuation of application No. 09/522,087, filed on Mar. 10, 2000, now Pat. No. 6,937,647.

(51) Int. Cl.
*H04B 3/46* (2006.01)
*H04B 17/00* (2006.01)
*H04Q 1/20* (2006.01)

(52) U.S. Cl.
USPC ............ 375/228; 340/541; 340/561; 340/566

(58) Field of Classification Search
USPC ........ 340/541, 552, 561–567, 573.3; 119/721
See application file for complete search history.

(56) References Cited

U.S. PATENT DOCUMENTS

| | | | | |
|---|---|---|---|---|
| 4,656,463 | A | 4/1987 | Anders et al. | |
| 5,355,208 | A * | 10/1994 | Crawford et al. | 356/35.5 |
| 5,446,446 | A * | 8/1995 | Harman | 340/566 |
| 5,576,972 | A | 11/1996 | Harrison | |
| 5,705,984 | A | 1/1998 | Wilson | |
| 5,903,217 | A | 5/1999 | Stanczak et al. | |
| 6,095,092 | A * | 8/2000 | Chou | 119/721 |
| 6,204,762 | B1 | 3/2001 | Dering et al. | |
| 6,937,647 | B1 | 8/2005 | Boyd et al. | |
| 2002/0007660 | A1 * | 1/2002 | Brown | 73/1.82 |

* cited by examiner

*Primary Examiner* — Curtis Odom
(74) *Attorney, Agent, or Firm* — Pitts & Lake, P.C.

(57) ABSTRACT

A system for monitoring and distinguishing occurrences along a perimeter bounded by at least one piezoelectric cable that completely defines the perimeter. The monitoring system utilizes at least one piezoelectric cable that generates electrical signals in response to mechanical stress events. The electrical signals from each piezoelectric cable are analyzed by a processing system to determine event classification and location. The monitoring system alerts users and connects to an existing security system to notify third-parties. The monitoring system includes functionality to communicate with a calibration unit and calibrate itself. The monitoring system also includes functionality to interface with a pet containment system.

3 Claims, 10 Drawing Sheets

PIEZOELECTRIC CABLE PERIMETER MONITORING SYSTEM

CROSS-REFERENCE TO RELATED APPLICATIONS

The present application is a continuation-in-part of application Ser. No. 11/214,522 filed Aug. 30, 2005 entitled “External Perimeter Monitoring System,” which is a continuation of application Ser. No. 09/522,087 filed Mar. 10, 2000, which issued as U.S. Pat. No. 6,937,647 on Aug. 30, 2005.

STATEMENT REGARDING FEDERALLY SPONSORED RESEARCH OR DEVELOPMENT

Not Applicable

BACKGROUND OF THE INVENTION

1. Field of Invention

This invention pertains to a system for monitoring an outdoor perimeter. More particularly, this invention relates to a system for monitoring and distinguishing between occurrences along a perimeter bounded by at least one piezoelectric cable that completely defines the perimeter.

2. Description of the Related Art

Residential and light commercial security systems have become an increasingly popular addition to many homes and businesses. These systems are typically based on the electronic detection of a structure. These systems generally classify any input as an event, whether the input is a system message, a detected breach of a perimeter, a detected breach of an interior, or a failure of some part of the security system. The event is analyzed to determine a specific classification, more specifically whether there has been a breach or not. If an event is determined to be in the nature of a breach, it is further classified as being caused by environmental conditions, an animal, a human, or an automobile.

In a residential and light commercial security system a breach is generally detected at either the perimeter or the interior of the structure. The perimeter is commonly defined as the outer surface of the structure. It is generally breached at the entrance/egress points to a structure such as doors and windows. Breaches at these entrance/egress points are generally detected by magnetic sensors that monitor the opening and closing of doors and windows and by frequency sensors attuned to the sound of glass breakage. Interior breaches are generally detected by heat and motion detectors that monitor moving objects having a temperature greater than the ambient temperature. While providing a warning of intrusion, both the detection of entrance/egress and interior breaches occur after the structure has been damaged or entry has been obtained.

In many security systems, motion sensors are used to turn on outdoor lighting, thereby providing a deterrent to intrusion onto the property. However, these sensors are indiscriminate in that they may be triggered by small animals, children, or other moving objects that are not considered security risks. Further, because of the difficulty in accurately setting the range, and the accurate detection zone of each sensor, setting up a comprehensive coverage area limited to the boundaries of one’s property is difficult. Finally, it should be noted that while the external sensors can be connected to a central alarm system, the inability to discriminate between legitimate security risks and stray animals and the difficulty in defining the protection area render such a system unreliable.

BRIEF SUMMARY OF THE INVENTION

A monitoring system for monitoring and distinguishing events along a perimeter bounded by a piezoelectric cable disposed about a perimeter to be monitored. Once a crossing event is detected, the present invention allows for classifying, locating, and indicating such event. The perimeter is defined around a selected area such as, for example, an area within which a pet is to be contained, or an area to be protected from intrusion. The present invention is also useful for alerting an interested party upon the occurrence of a selected event, such as a pet owner when their pet leaves a containment area.

The piezoelectric cable perimeter monitoring system of the preferred embodiment utilizes a single piezoelectric cable disposed about a perimeter. The piezoelectric cable is in communication with a processing system. The processing system is provided for analyzing electrical signals to determine event classification and location. The processing system includes a processing device for sequencing the operations of the piezoelectric cable perimeter monitoring system. The processing device receives signals from a piezoelectric cable via a boundary interface.

The processing device converts the analog electrical signals to digital vibration signatures then analyzes the vibration signatures to determine event classification and event location. This determination of event classification and location in the processing device may be accomplished in one of various methods. To classify the event, the processing device conditions the electrical signal and compares the detected activity signal to exemplary activity profiles from selected sources, such as humans, animals, and vehicles. In the preferred embodiment, location detection is performed by either a time-difference analysis or an attenuation analysis. After event classification has been confirmed, and after location of the event has been established, the processing device generates a result from the comparison that includes the event classification and location.

When the processing device determines that an event has occurred and resolves the origin, it communicates all relevant information to an external interface and an indicator device. The external interface translates the information from the processing device into a form which is usable by a conventional security system, allowing the piezoelectric cable perimeter monitoring system to be integrated with an existing detection system. The indicator device communicates with a personal user of the system.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

The present invention is a piezoelectric cable perimeter monitoring system for detecting crossing events along a perimeter utilizing at least one piezoelectric cable that completely defines a perimeter. Once a crossing event is detected, the present invention allows for classifying, locating, and indicating such events. The perimeter is defined around a selected area such as, for example, an area within which a pet is to be contained, or an area to be protected from intrusion and/or theft. The present invention is also useful for alerting an interested party upon the occurrence of a selected event, such as a pet owner when their pet leaves a containment area. The present invention is designed to be self-calibrating to adjust for changing conditions.

Figure 1:
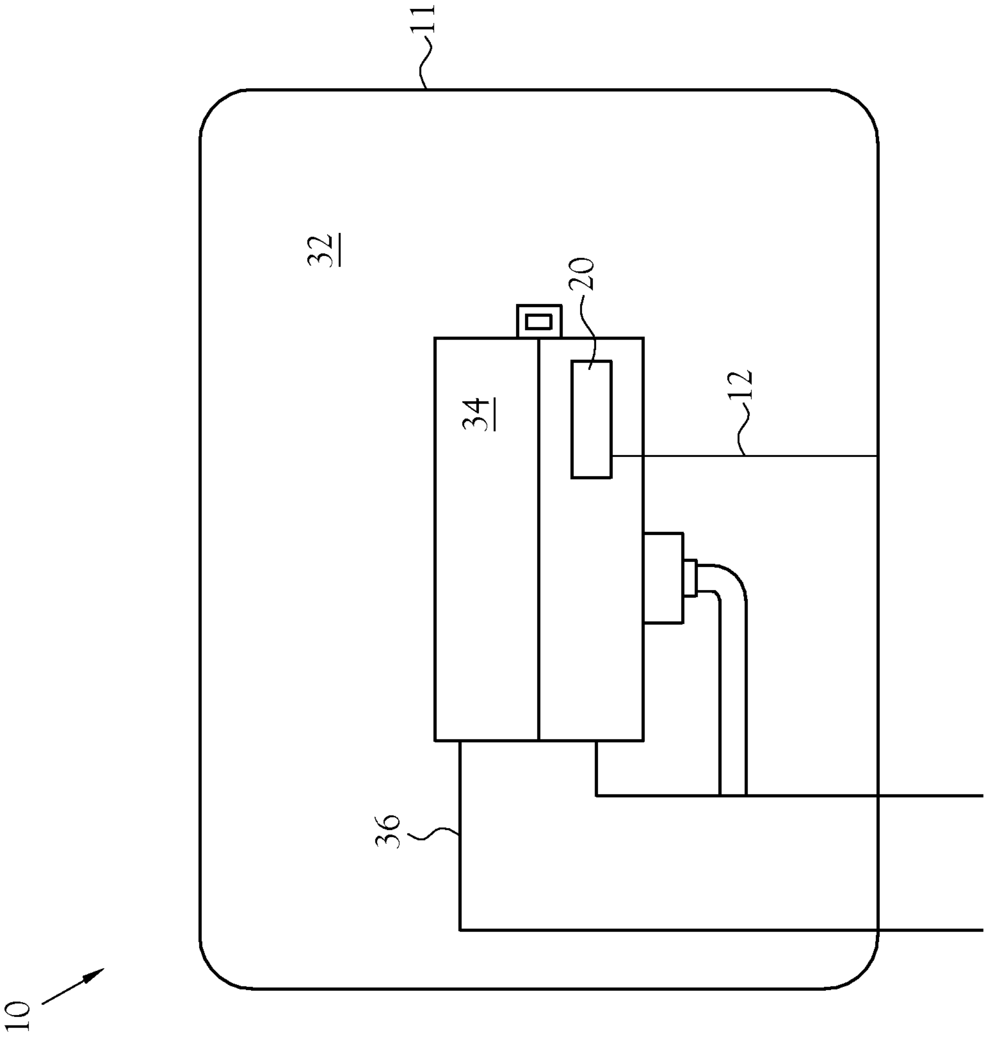
FIG. 1 is a schematic illustration of a perimeter monitoring system constructed in accordance with several features of the present invention and incorporating a single piezoelectric cable.

A piezoelectric cable perimeter monitoring system is illustrated generally at 10 in FIG. 1. The piezoelectric cable perimeter monitoring system 10 utilizes at least one piezoelectric cable 11 that is disposed about a perimeter, with this perimeter monitored for events. The piezoelectric cable perimeter monitoring system 10 is connected to the cable 11 via a cable 12 to a processing system 20, the cable 12 either being a terminal end of the cable 11, or a non-piezoelectric conductor connected between the cable 11 and the processing system 20. In the case of the non-piezoelectric conductor 12, events within the bounded area 32 which would otherwise be detected by a piezoelectric cable 12 are ignored, thereby limiting detected events to those occurring along the cable 11.

The piezoelectric cable perimeter monitoring system 10 as generally illustrated in FIG. 1 is protecting residential property. In this illustration the area 32 defined by the perimeter 11 comprises a residence 34 served by a driveway 36 with the processing system 20 for the piezoelectric cable perimeter monitoring system 10 located inside the residence 34. It will be appreciated by one skilled in the art that the location of the processing system 20 can be varied depending on the application of the piezoelectric cable perimeter monitoring system 10 and the area to be protected. The processing system 20 can reside in other housings, such as kiosks or environmentally-appropriate enclosures, without departing from the scope and spirit of the present invention. It will also be appreciated by one skilled in the art that this implementation of a piezoelectric cable perimeter monitoring system 10 is not limited to the monitoring of residential property. Examples of alternate uses of a piezoelectric cable perimeter monitoring system 10 include monitoring stationary objects, monitoring commercial buildings, monitoring open spaces of land or property, and monitoring inside buildings.

Figure 2:
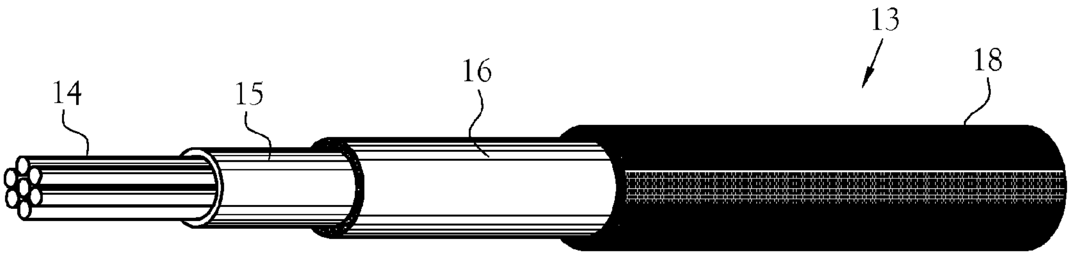
FIG. 2 is a perspective view of one piezoelectric cable used in association with the present invention, the cable being shown cut-away to illustrate the various elements therein.

FIG. 2 illustrates a cut-away view of a conventional piezoelectric cable 13 used with the present invention. One suitable cable is the KYNAR® PVDF Piezo Cable from Measurement Specialties, Inc. The piezoelectric cable 13 includes a stranded center core 14 surrounded by a piezo film tape 15. The piezo film tape 15 is covered by a shield 16, such as a copper shield braid or foil. A polyethylene outer sheath 18 encases the piezoelectric cable 13 to provide insulation from external electrical and environmental conditions. The piezo film tape 15 generates charge in response to mechanical stress or compression. The charge forms an electrical signal having an amplitude and frequency that is proportional to the mechanical stress or compression of the piezo film tape 15 traveling in both directions of the piezoelectric cable 13. The piezoelectric cable 13 detects vibrations of about 0.001 Hz from impacts as small as those about 10-12 grams up to about 300,000 atmospheres. The electrical signals caused by mechanical stress or compression are analyzed to determine the classification of the event and where the event originated. It will be appreciated by one skilled in the art that other manufactures of piezoelectric cables can be utilized with the present invention without departing from the scope and spirit of the present invention.

Figure 3:
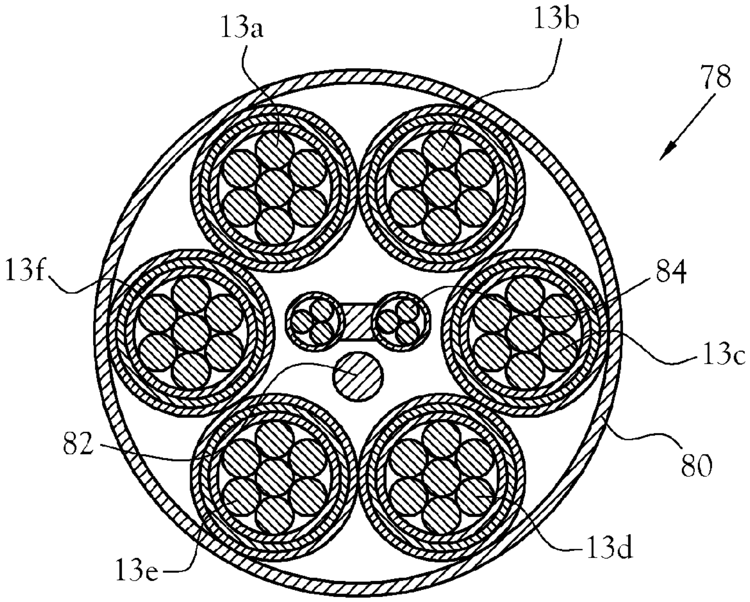
FIG. 3 is an end view, in cross section, of a composite cable including a plurality of piezoelectric cables used in accordance with several features of the present invention.

FIG. 3 illustrates a cross-section view of a preferred embodiment of a composite cable 78 adapted for use with the present invention as the cable 11. The composite cable 78 includes a sheath 80 that generally services as conduit for at least one piezoelectric cable 13. As shown in FIG. 3, the sheath 80 encases a plurality of piezoelectric cables 13*a-f*; a non-insulated single conducting wire 82 used as an antenna for communicating with calibration units, an antenna for operation as a pet containment system, or for both; and an insulated two-conductor wire 84 that is used for power, communication, or containment. Those skilled in the art will recognize that type and number of cables and wires comprising the composite cable 78 can be varied according to the desired features of the piezoelectric cable perimeter monitoring system 10 without departing from the scope and spirit of the present invention.

The composite cable 78 is used to bundle the myriad cables used to implement the piezoelectric cable perimeter monitoring system 10. This results in one efficient installation of cables and wires. It also ensures that the perimeters defined by at least one piezoelectric cable 13, the conducting wire 82, and the insulated two-conductor wires 84 are the same. In a typical installation at least one piezoelectric cable 13, an additional conducting wire 82, and an insulated two-conductor wire 84 are combined and buried in a composite cable 78. In an equally typical installation, at least one piezoelectric cable 13 and the conducting wire 82 are buried separately. While not illustrated, in a piezoelectric cable perimeter monitoring system 10 further comprising a pet containment system, two mean of protection are provided. A pet may be maintained within an inner perimeter defined by a conducting wire 82 and alert a user if the pet had escaped their containment when it approaches an outer perimeter defined by at least one piezoelectric cable 13. It will be apparent to one skilled in the art that the conducting wire 82 can be insulated if it is not buried in a composite cable 78.

In the various figures, it will be appreciated that exemplary layouts of a single piezoelectric cable 13 and other cables and wires are shown rather than a composite cable 78 to convey the detail of the present invention. One skilled in the art will recognize that different combinations of a composite cable 78 or cable layout for the piezoelectric cable perimeter monitoring system 10 exist. Each combination is dependent on the desired use and functionality of the system.

Figure 4:
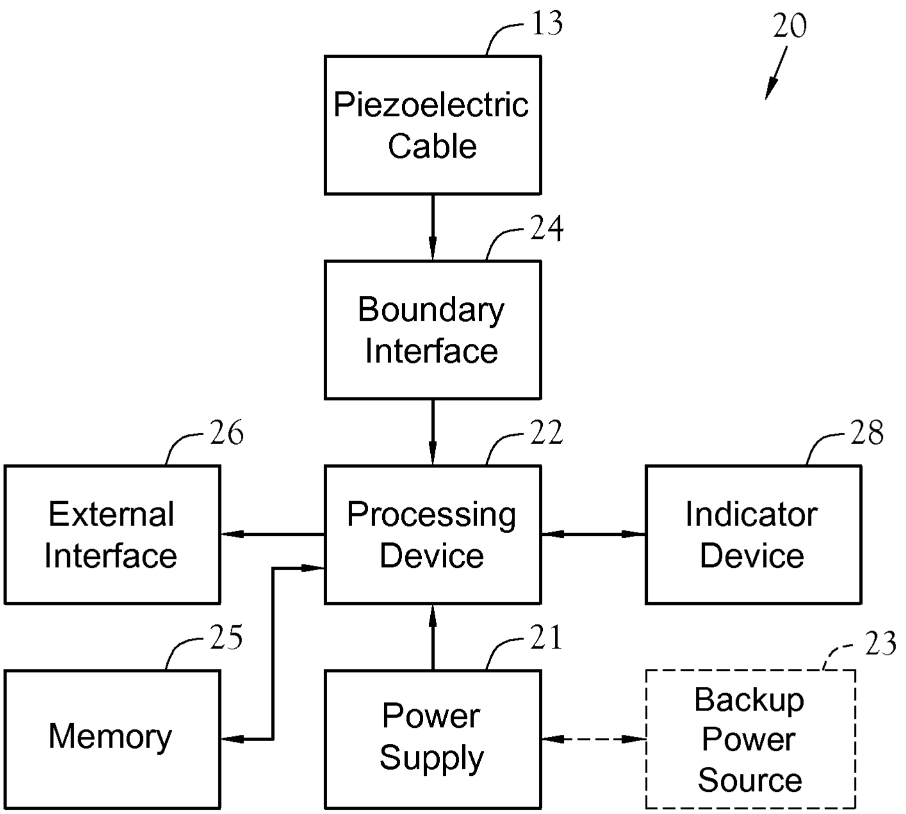
FIG. 4 is a schematic illustration of one embodiment of the processing system used in association with the present invention.

FIG. 4 illustrates a simplified schematic of one embodiment of the processing system at 20. The processing system 20 is provided for analyzing electrical signals to determine event classification and location. To this end, each end of each piezoelectric cable 13 is in electrical communication with the processing system 20 either directly or through an electrical conductor 12. In this illustration the processing system 20 has a power supply 21 that powers the piezoelectric cable perimeter monitoring system 10. Typically, this power supply 21 includes a backup power source 23 (illustrated in broken lines) in the event there is a loss of power from power supply failure or loss of current at the monitoring location. The use of a backup power source 23 prevents piezoelectric cable perimeter monitoring system 10 inoperability during times in which there is no power, thus maintaining security of the defined area 32. However, it will be understood by those skilled in the art that a backup power source 23 is not required for operation of the piezoelectric cable perimeter monitoring system 10.

In the processing system 20 the processing device 22 sequences the operations of the piezoelectric cable perimeter monitoring system 10. One skilled in the art will recognize that the processing device may be implemented in a variety of conventional ways. In the illustrated embodiment, the processing device 22 is a microprocessor, allowing the functionality of the processing system 20 to vary with minimal hardware changes through the use of software. In the illustrated embodiment, the processing device 22 receives signals from a piezoelectric cable 13 via a boundary interface 24. It will be appreciated by one skilled in the art that a variety of electrical components can be used to implement the boundary interface 24, including a conductive material, conducting wires, couplings, or another means.

The processing device 22 converts the analog electrical signals to digital vibration signatures then analyzes the vibration signatures to determine event classification and event location. This determination of event classification and location in the processing device 22 may be accomplished in one of various methods. To classify the event, the processing device 22 conditions the electrical signal and compares the detected activity signal to exemplary activity profiles from selected sources, such as humans, animals, and vehicles. A memory 25 is provided in communication with the processing device 22 for storing a library of profiles useful for comparison with the detected activity signal.

The particular event location analysis depends on the type of location detection desired by the user. When a single piezoelectric cable 13 is employed about the perimeter, location detection is performed by either a time-difference analysis or an attenuation analysis. After event classification has been confirmed, and after location of the event has been established, the processing device 22 generates a result from the comparison that includes the event classification and location. In the illustrated embodiment, the processing device 22 is configured to generate one of four responses for further indication: human, animal, vehicle, or no activity.

When the processing device 22 determines that an event has occurred and resolves the origin, it communicates all relevant information to an external interface 26 and an indicator device 28. The external interface 26 translates the information from the processing device 22 into a form which is usable by a conventional residential and light commercial security system, allowing the piezoelectric cable perimeter monitoring system 10 of the present invention to be integrated with an existing detection system. Such integration allows the piezoelectric cable perimeter monitoring system 10 to be monitored by an off-premises security monitoring company. The indicator device 28 communicates with a personal user of the system. One skilled in the art will recognize that the indicator 28 implementation can vary depending on the type and amount of information offered to the user. In the illustrated embodiment the indicator 28 is a multi-line, alphanumeric display screen which can display the time, date, location, and type of activity. Other types of indications could be utilized, such as audio tones or light-emitting diodes representing specific locations or classifications. Finally, one skilled in the art will recognize that other types of information can be communicated through the indicator device 28 including, but not limited to, diagnostic information and system status.

The processing device 22 is configured to selectively transmit relevant information to the appropriate devices. For example, in one embodiment, when an animal is detected, the processing device 22 transmits an alert, event classification, and event location to the indicator device 28 but not the external interface 26. Similarly, where a human or vehicle is detected the processing device 22 may transmit an alert, event classification, and event location to both the external interface 26 and the indicator device 28.

Figure 5:
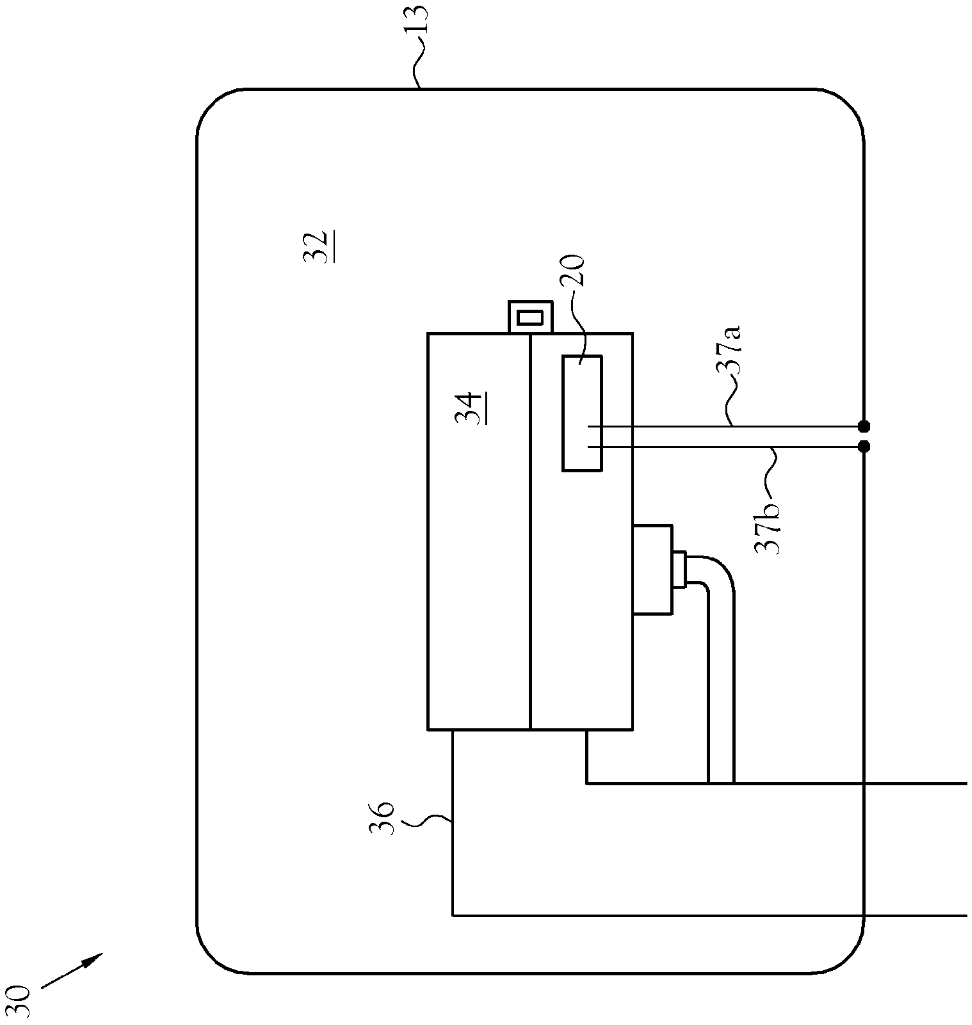
FIG. 5 is a schematic illustration of a further embodiment of a piezoelectric cable perimeter monitoring system of the present invention wherein the piezoelectric cable is in communication with the processing system via electrical conductors.

FIG. 5 illustrates an embodiment of a piezoelectric cable perimeter monitoring system 30 comprising a single piezoelectric cable 13. In this illustration the defined area 32 comprises a residence 34 served by a driveway 36 with the processing system 20 for the piezoelectric cable perimeter monitoring system 30 located inside the residence 34. The defined area 32 is bound by a piezoelectric cable 13 that completely defines the perimeter to be monitored. Each end of the piezoelectric cable 13 is in electrical communication with the processing system 20 for the piezoelectric cable perimeter monitoring system 30. In the illustrated embodiment, electrical conductors 37*a*,37*b* are in electrical communication between the processing system 20 and one of each end of the piezoelectric cable 13. In this embodiment, activity which would be considered a monitored event but which takes place in the proximity of the electrical conductors 37*a*,37*b* does not signal the occurrence of an event to the processing system 20.

Figure 6:
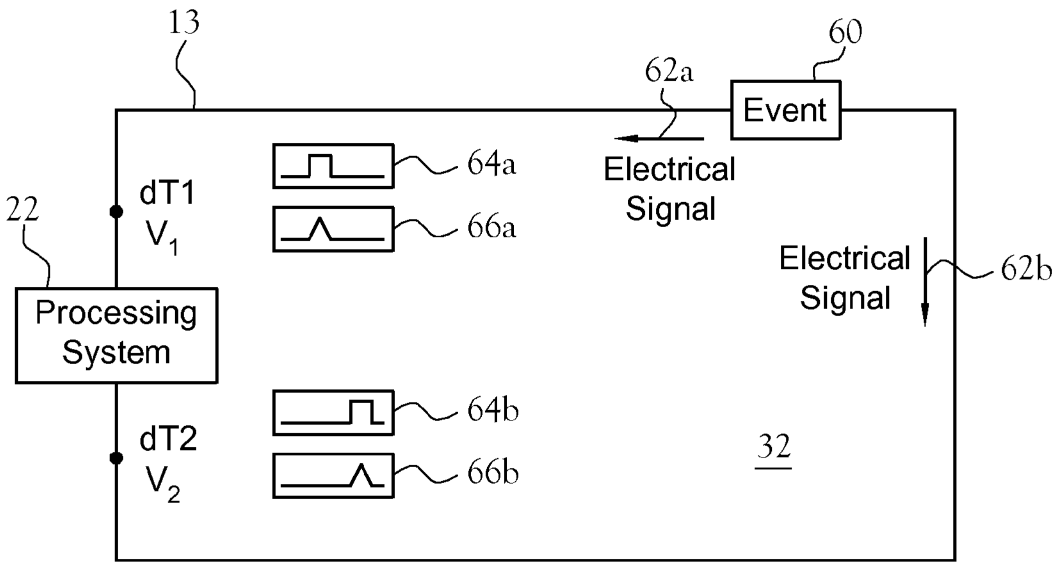
FIG. 6 is a schematic illustration of the propagation of electrical signals along a single piezoelectric cable used in accordance with several features of the present invention.

FIG. 6 generally illustrates the propagation of electrical signals in one embodiment of the piezoelectric cable perimeter monitoring system 30 in which a single piezoelectric cable 13 completely defines the perimeter. The difference in propagation characteristics is used to determine the event origin, and subsequent location along a perimeter defined by the cable 13. Upon an event 60 electrical signals 62*a*,62*b* propagate in both directions through the cable 13. One electrical signal 62*a* propagates counter-clockwise incurring a time delay of $dT_1$ 64*a* while the electrical signal 62*b* propagates clockwise incurring a time delay of $dT_2$ 64*b*. The delay difference in the arrival of the electrical signals 62*a* and 62*b* at the processing system 20 is most efficiently used to determine location along the cable 13 for events of a short duration. For example, if the counter-clockwise signal 62*a* and clockwise signal 62*b* arrive at exactly the same time at the processing system 20 the event 60 is located at the halfway point around a piezoelectric cable 13.

Because of the characteristics of a lossy cable, the electrical signals 62*a*,62*b* attenuate as they travel along a piezoelectric cable 13. The counter-clockwise signal 62*a* has an amplitude of $V_1$ 66*a* at the processing system 20 and the clockwise signal 62*b* has an amplitude of $V_2$ 66*b* at the processing system 20. The difference in amplitude of the two signals 62*a*,62*b* is analyzed to determine the location of the event. The difference in amplitudes of the two signals 62*a*,62*b* at the processing system 20 is most efficiently used to determine location along an uncut piezoelectric cable 13 for events of a long duration. For example, if the amplitudes 66*a*,66*b* of the signals 62*a*,62*b* are the same then the event 60 is located at the halfway point around a piezoelectric cable 13.

Figure 7:
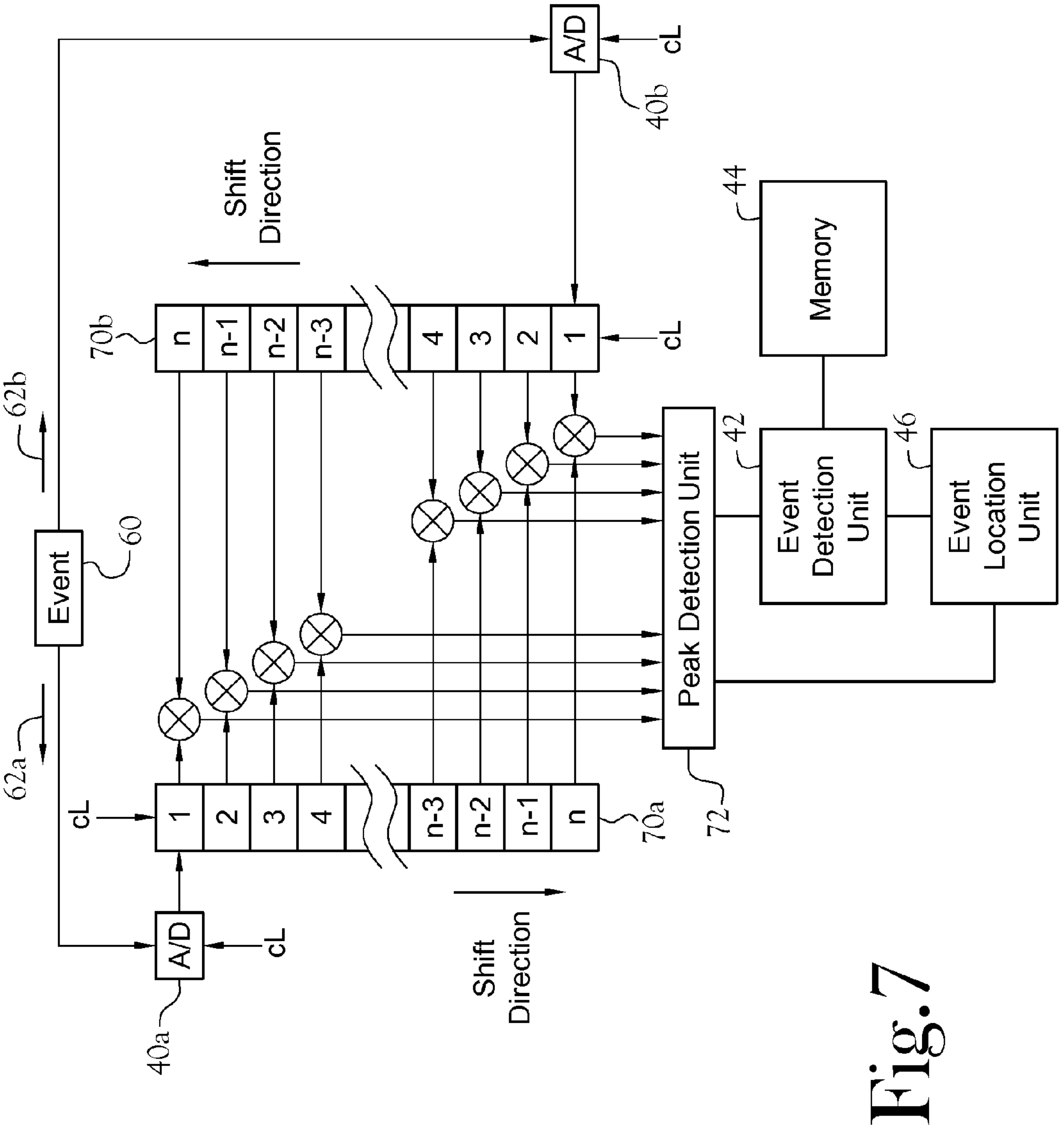
FIG. 7 is a schematic illustration of one embodiment of event and location detection in a processing system used in association with the present invention and utilizing a propagation time comparison to determine the location of an event.

FIG. 7 illustrates an embodiment of event and location detection in a processing system 30. This approach utilizes a propagation time comparison to determine the location of the event. In this exemplary illustration, one piezoelectric cable 13 is used. Once an event 60 occurs, the electrical signals 62*a*,62*b* propagate in both directions along a piezoelectric cable 13 to analog-to-digital converters 40*a*,40*b*. The ADC's 40*a*,40*b* transform the analog electrical signals into digital vibration signatures. Because of the nature of the medium in which they travel, the electrical signals 62*a*,62*b* have different arrival times at the ADC's 40*a*,40*b*. This difference in arrival times results in different conversion times at the ADC's 40*a*,40*b*. In this implementation, due to the speed at which the signals travel and the desire for high sensitivity, the ADC's 40*a*,40*b* of the preferred embodiment operate at high speeds, requiring more power but resulting in faster conversion and more accurate event location determination.

The vibration signatures proceed to the respective one of registers 70*a*,70*b* and are stored as they are converted. At the registers 70*a*,70*b* the signatures rotate in opposite directions and are multiplied together as they rotate. The peak detection unit 72 determines when an event, or "peak," is observed. This peak occurs only once when the registered vibration signatures are aligned. In the illustrated embodiment, the aligned vibration signature is analyzed in the event detection unit 42 through comparison to an exemplary vibration signature stored in a memory unit 44. After comparison the electrical signal is classified appropriately. Alternate embodiments of the event detection unit 42 use threshold comparison, peak comparison of the vibration signatures, or extrapolation of qualities and key indicators of the event to determine classification. It may be determined from comparison that no event has occurred, or that the event is caused by a human, an animal, or a vehicle.

If the event detection unit 42 classifies the electrical signal as an event, analysis continues at the event location unit 46. The event location unit 46 determines when the peak event occurs in the peak detection unit 72. The difference as to the time in each register 70*a*,70*b* when the peak event occurs is computed. Once the time difference between arrivals of the electrical signals 62*a*,62*b* at the processing system 20 is computed, the location of the event is determined by multiplying a propagation constant of the cable 13 by the time differential. The result is the longer of the two distances traveled from the location of the event to the processing system 22 by the electrical signals 62*a*,62*b*. Referring to FIG. 4, after the event characteristics are determined the information on the required alert, event classification, and event location are sent from the processing device 22 to the external interface 26 and the indicator device 28 for appropriate action.

Figure 8:
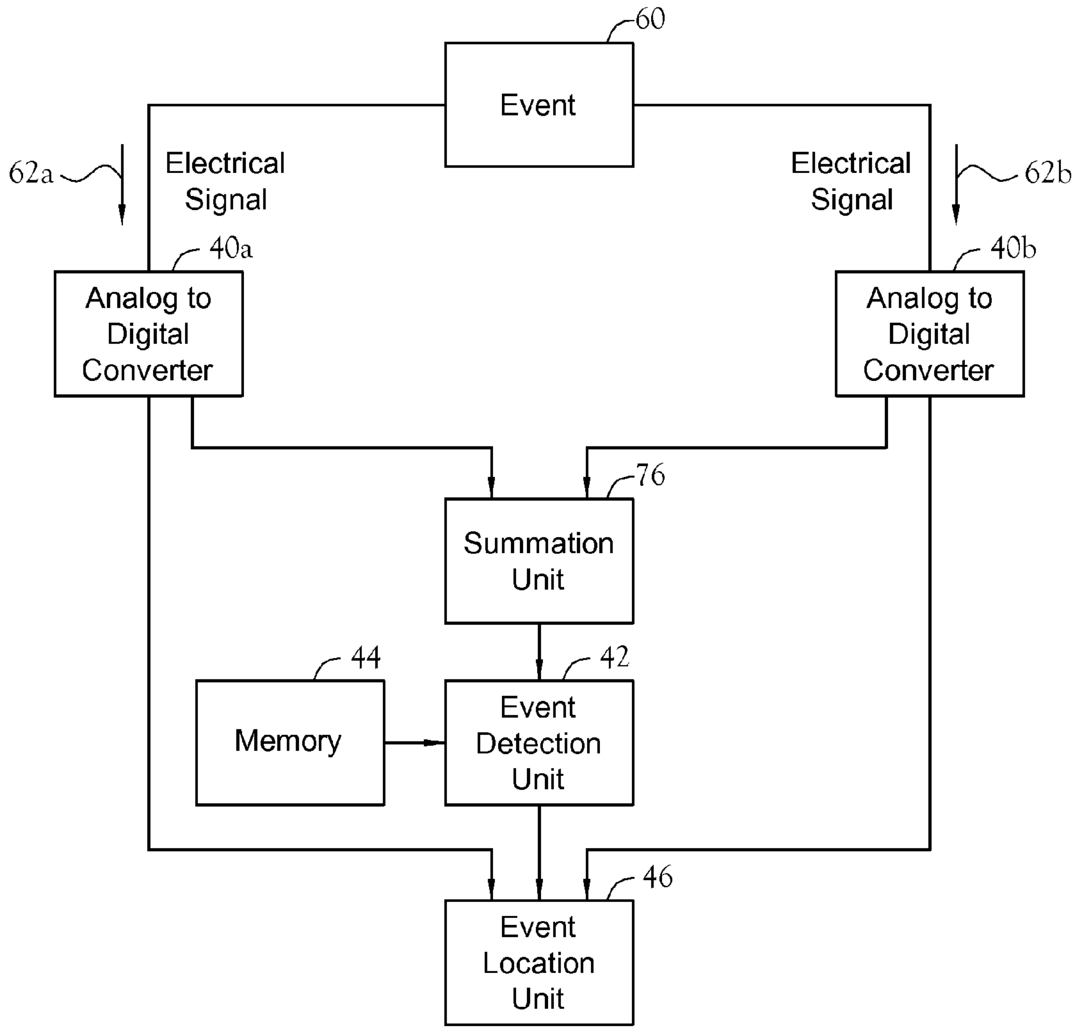
FIG. 8 is a schematic illustration of an alternate embodiment of event classification and location detection in a processing system used in association with the present invention and utilizing an attenuation analysis to determine the location of an event.

FIG. 8 illustrates an alternate embodiment of event classification and location detection in a processing system 20. This approach utilizes an attenuation analysis to determine the location of the event. In this illustration, one exemplary piezoelectric cable 13 is used. Once the event 60 occurs, the electrical signals 62*a*,62*b* propagate in both directions to the ADC's 40*a*,40*b*. The ADC's 40*a*,40*b* transform the analog electric signals 62*a*,62*b* into digital vibration signatures. Due to the nature of the medium in which they travel, the electric signals have different amplitudes at the ADC's 40*a*,40*b*. Because the speed at which the electric signals propagate is not used to determine location, the ADC's 40*a*,40*b* in this attenuation analysis do not have to work as fast as those needed for propagation time comparison disclosed above. This results in lower cost for the ADC's 40*a*,40*b* and lower energy requirements.

From the ADC's 40*a*,40*b*, the vibration signals are communicated to the summation unit 76 and undergo summation to provide a higher quality signal for the event detection unit 42. The event detection unit 42 compares the summed vibration signature to a calibrated exemplary vibration signature stored in memory 44 and classifies the event accordingly. Alternate embodiments of the event detection unit 42 use threshold comparison, peak comparison of the vibration signatures, or extrapolation of qualities and key indicators of the event to determine classification. As in the previous analysis, it may be determined from comparison that no event has occurred, or that the event is caused by a human, an animal, or a vehicle.

If the event detection unit 42 classifies the electrical signal as an event, the vibration signatures are communicated to the event location unit 46. Based on the propagation of a signal in a lossy cable, the vibration signatures from the electrical signals 62*a*,62*b* have different amplitudes unless the event occurred equidistance from each end of the cable 13. The event location unit 46 computes the location by analyzing the differential between the amplitudes of the vibration signatures through use of an attenuation equation.

The attenuation equation used by the event location unit 46 in this embodiment is derived from the knowledge of the properties of a lossy cable. At the source of the event the amplitude of the signal is $v_0$. At the ends, the amplitude of the voltage is $v_1=v_0e^{-\alpha x_1}$ and $v_2=v_0e^{-\alpha x_2}$. In these equations, $x_1$ and $x_2$ are the distances from the location of the event 60 to either end of the piezoelectric cable 13 at the processing system 20, while $\alpha$ is the loss constant of the cable 13 that is a function of the specific cable design. To determine the location of the event 60, the term $v_0$ is eliminated. By setting $v_0$ equal to one of the voltage amplitudes at the end of the cable 13, for example $v_0=v_1e^{\alpha x_1}$ (in this case $v_1$), the other amplitude equation becomes $v_2=v_1e^{\alpha x_1}e^{-\alpha x_2}$. Setting up a ratio and combining like terms results in $$\frac{v_2}{v_1} = e^{\alpha(x_1,x_2)}.$$

Taking the natural log of this yields ln $$\left(\frac{v_2}{v_1}\right) = \alpha(x_1 - x_2),$$

which reduces to $$\frac{\ln(v_2) - \ln(v_1)}{\alpha} = x_1 - x_2.$$

Since the amplitudes $v_1$ and $v_2$ are measured, and the value $\alpha$ is known, the difference $x_1-x_2$ is computed. This computed value is the differential in the distance from the location of the event to either end of the piezoelectric cable 13. This differential, whether positive or negative, is added to a value that corresponds to the midpoint distance between the two ends of the piezoelectric cable 13. The final value identifies the distance from the processing system at the piezoelectric cable end $x_1$ to the event. Referring to FIG. 4, after the event characteristics are determined the information on the required alert, event classification, and event location are sent from the processing device 22 to the external interface 26 and the indicator device 28 for appropriate action.

Figure 9:
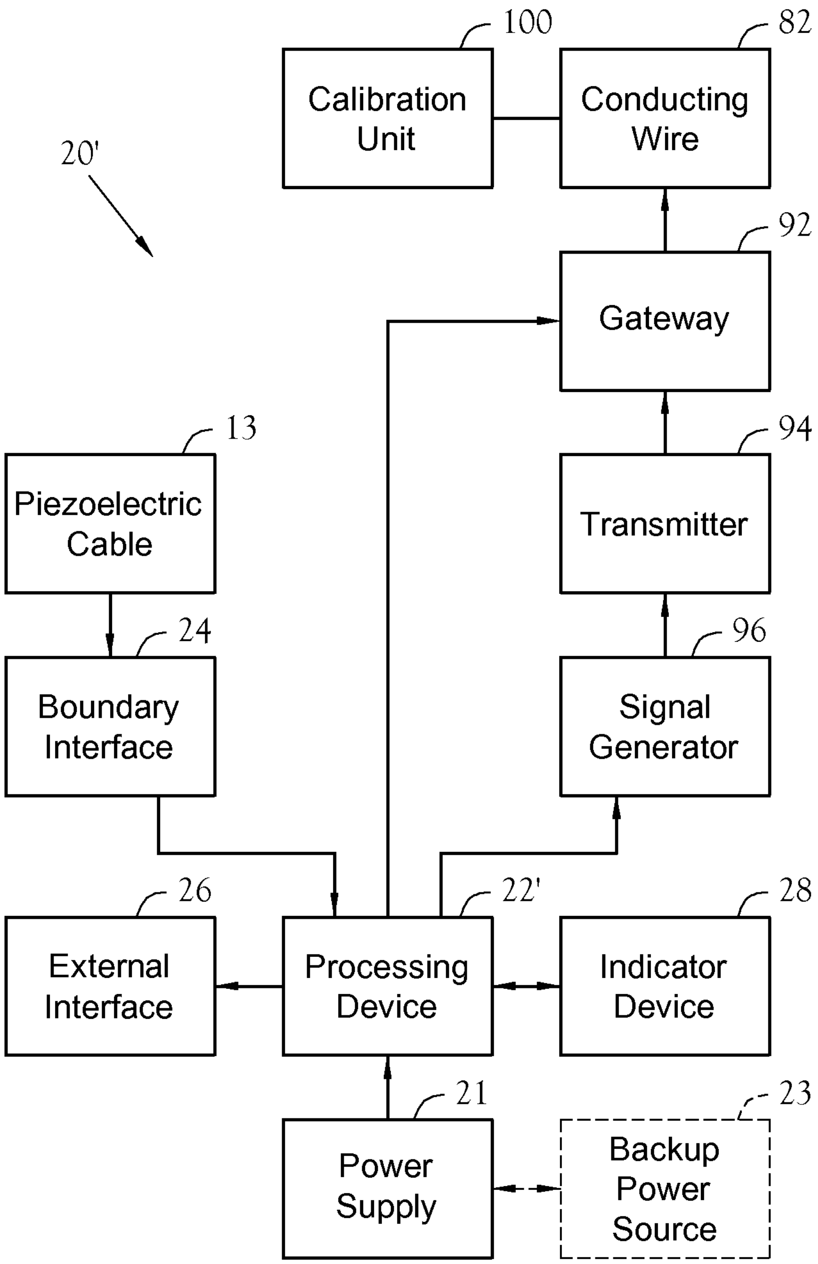
FIG. 9 is a block diagram of an embodiment of the processing system used in association with a piezoelectric cable perimeter monitoring system that utilizing a conducting wire such as that utilized in a conventional animal containment system.

FIG. 9 illustrates a block diagram of an embodiment of the processing system 20' of a piezoelectric cable perimeter monitoring system that utilizes a conducting wire 82, such as that utilized in a conventional animal containment system. In this illustration the processing system 20' includes a power supply 21 for powering the piezoelectric cable perimeter monitoring system 10. Typically, this power supply 21 includes a backup power source 23 (illustrated in shadow lines) in the event there is a loss of power from power supply failure or loss of current at the monitoring location. The use of a backup power source 23 prevents piezoelectric cable perimeter monitoring system inoperability during times in which there is no power. However, it will be understood by those skilled in the art that a backup power source 23 is not required for operation of the piezoelectric cable perimeter monitoring system 10 of the present invention.

The processing device 22' receives an electrical signal from the cable 13 through the boundary interface 24. Each electrical signal is analyzed in the processing system 20' to find its event classification and location in the same way as disclosed above. This allows the processing system 20' to detect, classify, and locate events, then generate appropriate alert signals.

In this embodiment of a processing system 20' of the present invention, the processing device 22' further comprises the ability to communicate with a conducting wire 82. The conducting wire is electrically connected to a gateway 92. The purpose of the gateway 92 is to determine which of the various signals has the right of way on the conducting wire 82. Among the signals competing for use of the conducting wire 82 are information signals directed to a calibration unit from the processing device 22' and transmission of a pet containment signal.

The processing device 22' is in electrical communication with the gateway 92. More specifically, the processing device 22' is in electrical communication with a signal generator 96 and with a gateway 92. The transmitter 94 is in electrical communication between the signal generator 96 and the gateway 92. The signal generator 96 generates a radio frequency modulated electromagnetic signal of the type used in typical pet containment systems and a calibration unit, and delivers the signal to the transmitter 94. The transmitter 94, in turn, transmits the signal through the conducting wire 82 when the gateway 92 permits transmission. To this extent, the gateway 92 is in electrical communication with the conducting wire 82. The signals to a pet receiver 114 (see FIG. 11) and calibration unit 100 must coexist on the conducting wire 82. Therefore, each signal is routed through the gateway 92 where the timing of each signal is controlled by the processing device 22'. The signals broadcast on the conducting wire 82 are received by a receiver worn by a pet that utilizes a deterrent to restrain the pet from leaving a perimeter. The signals broadcast on the conducting wire 82 are also received by a calibration unit 100, which generates electrical signals on the piezoelectric cable 13.

Figure 10:
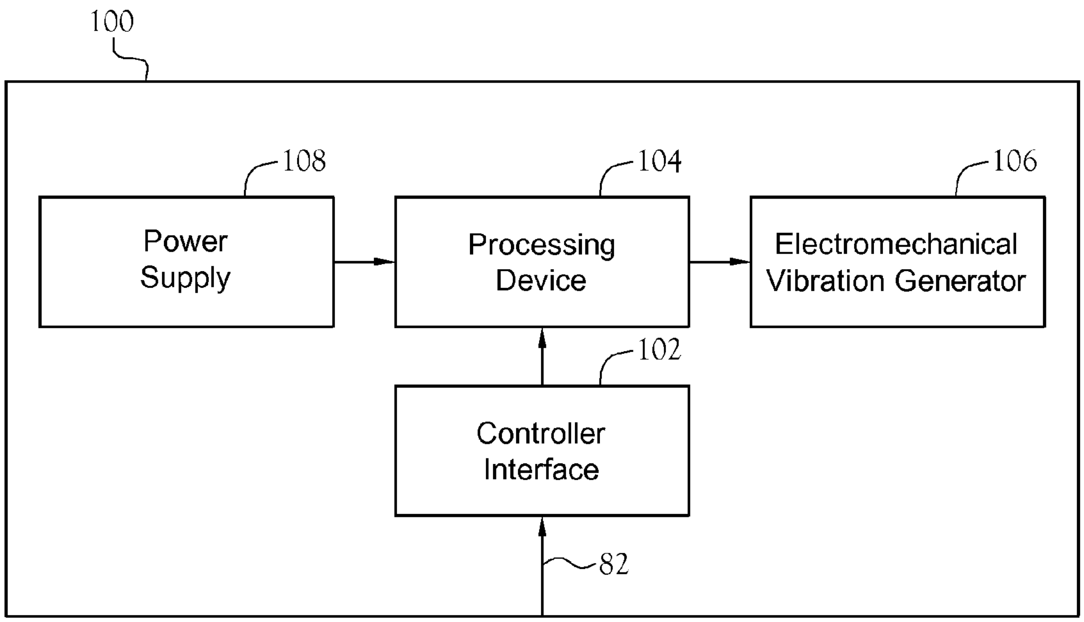
FIG. 10 is a block diagram of an embodiment of the calibration unit used in association with the present invention.

The calibration unit 100 generates a known vibration signal to adjust a piezoelectric cable perimeter monitoring system 10. The calibration unit 100 serves to increase reliability in response to different factors, which include installation depth, soil composition, and environmental factors. FIG. 10 illustrates a simplified schematic of one embodiment of a calibration unit 100, which generates a predefined mechanical stress on a predefined area of ground. This stress generates an electrical signal on at least one piezoelectric cable 13 to calibrate the piezoelectric cable perimeter monitoring system 10. In this embodiment, the conducting wire 82 is utilized as an antenna to generate a specific radio frequency modulated electromagnetic signal received by a controller interface 102.

The calibration unit 100 detects the activation signal transmitted through the conducting wire 82 in the controller interface 102. The signal is translated and sent to the processing unit 104 to determine the type of calibration signal requested. The use of a processing unit 104 allows the calibration unit 100 to store and initiate many different patterns of vibration signatures. An electromechanical vibration generator 106 produces the requested compression or vibration and instigates an electrical signal in the piezoelectric cable 13. The electrical signal is then transmitted to the processing system 20' embodied in the block diagram of FIG. 9.

Referring back to FIG. 9, the processing system 20' in this embodiment has an expected signal stored in memory corresponding to the predefined compression. The processing system 20' evaluates the calibration signal with respect to the expected signal and adjusts the sensitivity of the piezoelectric security system 10 accordingly. Alternate embodiments use a comparison of stored vibration signatures, threshold comparisons, or extrapolation of qualities/key indicators of the intrusion to determine the operating characteristics of the piezoelectric cable perimeter monitoring system. If the data in memory or otherwise present differs from that received from the calibration unit 100, then the stored expected signal, stored signatures, stored thresholds, or extrapolated qualities/key indicators are adjusted by the processing system 20'. The adjustment occurs by changing the amplitudes, frequencies, key characteristics, or waveforms of the stored signals, stored signatures, stored thresholds, or extrapolated qualities/key indicators.

In FIG. 10, the calibration unit 100 includes a power supply 108. In one embodiment, the power supply 108 is a voltage regulation or matching circuit conditioning a power signal received from the processing system 20' through an additional conducting wire 82 adapted for electrical signal transmission. In an alternate embodiment, the power supply 108 is a voltage regulation or matching circuit conditioning a power signal received from the processing system 20' through an insulated two-conductor wire 84. The insulated two-conductor wire 84 is buried with the conducting wire 82, a piezoelectric cable 13, in a composite cable 78, or in any other arrangement sufficient to power the calibration unit 100. In another alternate embodiment, the power supply 108 of the calibration unit 100 generates or derives power from a power source other than the processing system 20', such as, for example, a battery, a solar cell, or a direct AC connection.

In one embodiment of FIG. 10, the electromechanical vibration generator 106 of the calibration unit 100 is a solenoid-type device. The processing device 104 activates the solenoid, causing the core of the solenoid to hit the ground, causing vibrations to be detected by the piezoelectric cable 13. The processing system 20' then analyzes the signal as previously discussed. Those skilled in the art will recognize that other ways of calibrating the processing system 20' can be employed without departing from the scope or spirit of the present invention, including through the use of a motor with an eccentric weight, a mechanical motor attached to an object that compresses the ground, an electric motor attached to an object that compresses the ground, or an acoustic device that causes vibration in the soil such that it produces a signal that the piezoelectric cable perimeter monitoring system is responsive.

Figure 11:
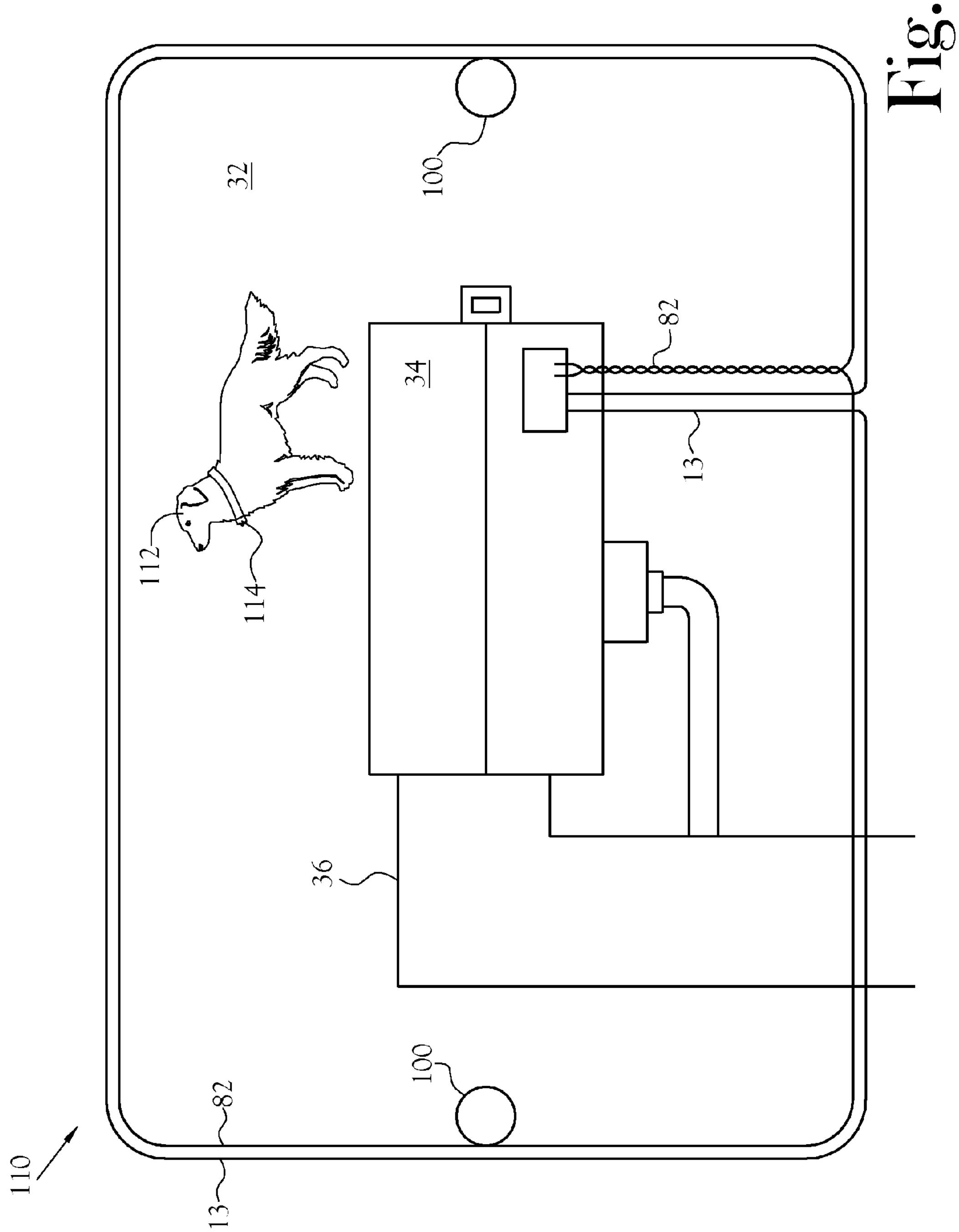
FIG. 11 is a schematic illustration on one embodiment of the piezoelectric cable perimeter monitoring system utilizing a single piezoelectric cable and further comprising a pet containment conducting wire and a calibration system.

FIG. 11 illustrates an embodiment of the piezoelectric cable perimeter monitoring system 110 utilizing a piezoelectric cable 13 that completely defines a perimeter, and further comprising a pet containment function and a calibration system comprised of at least one calibration unit 100. The pet containment system is equally effective when used in conjunction with one or more calibration units 100, as illustrated, or used without a calibration unit 100.

Referring to FIG. 9 and FIG. 11, the gateway 92 is configured to communicate with either a pet containment system or a calibration unit 100 by controlling the signal sent over the conducting wire 82. The conducting wire 82 transmits a specific radio frequency modulated electromagnetic signal of the type used in typical pet containment systems and to which the calibration unit 100 is responsive. A receiver 114 responsive to the electromagnetic field generated by the conducting wire 82 is worn by a pet 112. As the pet approaches the conducting wire 82, the receiver 114 detects the electromagnetic field and a deterrent is administered, restraining the pet 112 from leaving the defined area 32. Any animal not carrying a receiver 114 that approaches and/or breaches the perimeter of the desired area of observation will not receive a deterrent, thus restraining only a pet 112 carrying the receiver 114. In this implementation the conducting wire 82 is twisted with itself so as to suppress the electromagnetic field along the conducting wire 82, thus allowing the receiver 114 equipped pet 112 to access all areas of the yard not defined by the conducting wire 82 without receiving a deterrent. It will be apparent to one skilled in the art that in this embodiment of the piezoelectric cable perimeter monitoring system 110, the processing system 20' can include functionality to alert a user to a number of different activity signals. For example, a user may want to have an alert when a pet breaches the perimeter defined by at least one piezoelectric cable 13, but not when the pet approaches the perimeter defined by the conducting wire 82 and receives a deterrent.

Features of the present invention of a piezoelectric cable perimeter monitoring system include cable-break detection, numerous object classification, object location detection, and alert indication. The piezoelectric cable perimeter monitoring system that utilizes at least one piezoelectric cable to completely define a perimeter is useful because of the ease of installation, advanced location detection, and flexibility in regards to determining the location of an event. This embodiment of the present invention uses time difference analysis, attenuation analysis, or both, depending on the requirements of the system or desires of the user. In addition, either embodiment of the piezoelectric cable perimeter monitoring system can further include at least one calibration unit, a pet containment system, or both. This inclusion is effected by utilizing a conducting wire as an antenna to broadcast signals and adding functionality to the processing system.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicants general inventive concept.

What is claimed is:

1. A system for monitoring and distinguishing events along a perimeter, said system comprising:
- at least one piezoelectric cable, said at least one piezoelectric cable defining a perimeter bounding an area, said at least one piezoelectric cable being provided for generating electrical signals in response to mechanical stress;
- a processing system in electrical communication with said at least one piezoelectric cable, and processing system for sequencing operation of said system, said processing system for detecting an event in response to electrical signals generated by said at least one piezoelectric cable;
- a power supple for providing power to said system;
- a conducting wire in electrical communication with said processing system, said conducting wire being disposed substantially about the perimeter, said conducting wire being provided for broadcasting and electromagnetic signal;
- a processing device selected from the group consisting of a computer, logic components, a microcontroller, and a microprocessor; said processing device for sequencing the operation of said processing system;
- a signal generator in electrical communication with said processing device, said signal generator for generating a signal using input from said processing device;
- a transmitter in electrical communication with said signal generator, said transmitter for broadcasting an electromagnetic signal through said conducting wire; and
- a gateway circuit in electrical communication with said transmitter, said gateway circuit in electrical communication with said processing device and with said conducting wire, said gateway circuit for controlling access to said conducting wire such that transmitted electromagnetic signals are not distorted by interference from other transmitted electromagnetic signals.

2. The system of claim 1 further comprising a calibration unit in communication with said conducting wire, said calibration unit responsive to said electromagnetic signal broadcast by said conducting wire, said calibration unit for generating a vibration signature proximate said at least one piezoelectric cable.

3. The system of claim 2 wherein said calibration unit comprises:
- a calibration unit processing device for sequencing the operation of said calibration unit, said calibration unit processing device for determining a desired response of said calibration unit;
- a controller interface circuit able to receive electromagnetic signals broadcast by said conducting wire, said controller interface circuit in electrical communication with said calibration unit processing device, said controller interface circuit for converting electromagnetic signals broadcast on said conducting wire into digital signals;
- a calibration unit power supply in electrical communication with said calibration unit processing device, said calibration unit power supply for powering said calibration unit; and
- a vibration unit in electrical connection with said processing device, said vibration unit for generating said vibration signature.

* * * * *